United States Patent
Zhao et al.

(10) Patent No.: US 10,615,622 B2
(45) Date of Patent: Apr. 7, 2020

(54) CHARGING DETECTION AND CONTROL APPARATUS

(71) Applicant: NOREL SYSTEMS LIMITED, Tianjin (CN)

(72) Inventors: Wei Zhao, Tianjin (CN); Yuanlong Wang, Tianjin (CN); Ting Wu, Tianjin (CN); Hui Wang, Tianjin (CN)

(73) Assignee: NOREL SYSTEMS LIMITED, Tianjin (CN)

(*) Notice: Subject to any disclaimer, the term of this patent is extended or adjusted under 35 U.S.C. 154(b) by 340 days.

(21) Appl. No.: 15/694,075

(22) Filed: Sep. 1, 2017

(65) Prior Publication Data
US 2017/0366016 A1 Dec. 21, 2017

Related U.S. Application Data

(63) Continuation of application No. PCT/CN2016/000303, filed on Jun. 12, 2016.

(30) Foreign Application Priority Data

Jun. 25, 2015 (CN) .......................... 2015 1 0358790

(51) Int. Cl.
*H02J 7/00* (2006.01)
*H01R 27/00* (2006.01)
*H01M 10/42* (2006.01)

(52) U.S. Cl.
CPC .............. *H02J 7/007* (2013.01); *H01R 27/00* (2013.01); *H02J 7/00* (2013.01); *H01M 10/4257* (2013.01)

(58) Field of Classification Search
CPC ................................ H02J 7/007; H01R 27/00
(Continued)

(56) References Cited

U.S. PATENT DOCUMENTS

2011/0316472 A1* 12/2011 Han ..................... G06F 13/4068
320/103
2016/0277052 A1* 9/2016 Sadek .................. H04B 1/3888

FOREIGN PATENT DOCUMENTS

CN        1914582 A     2/2007
CN      202772364 U     3/2013
(Continued)

OTHER PUBLICATIONS

State Intellectual Property Office of the P.R. China (ISR/CN), "International Search Report for PCT/CN2016/000303" China, dated Sep. 14, 2016.

*Primary Examiner* — Edward Tso
*Assistant Examiner* — Aaron Piggush
(74) *Attorney, Agent, or Firm* — Locke Lord LLP; Tim Tingkang Xia, Esq.

(57) ABSTRACT

A charging detection and control apparatus for an Apple device, including: a charging input interface, a detection apparatus, a control apparatus and a charging output interface. An input terminal of the detection apparatus is connected to a charging source terminal via the charging input interface, an output terminal of the detection apparatus is connected to an input terminal of the control apparatus, an output terminal of the control apparatus is connected to the Apple device via the charging output interface, the detection apparatus detects a capacity for charging current of the charging source terminal inserted into the charging input interface, and outputs a detection result to the control apparatus, the control apparatus converts the received detection result into a charging parameter complying with Apple standards, and sends the charging parameter to the Apple device via the charging output interface.

16 Claims, 5 Drawing Sheets

(58) Field of Classification Search
USPC ................................ 320/107, 114, 134, 162
See application file for complete search history.

(56) References Cited

FOREIGN PATENT DOCUMENTS

| | | |
|---|---|---|
| CN | 203722283 U | 7/2014 |
| CN | 203983681 U | 12/2014 |
| CN | 104467135 A | 3/2015 |
| CN | 104578321 A | 4/2015 |
| CN | 104917246 A | 9/2015 |
| TW | 201306431 A | 2/2013 |

\* cited by examiner

CHARGING DETECTION AND CONTROL APPARATUS

CROSS-REFERENCE TO RELATED APPLICATION

This application is a continuation application of International Patent Application No. PCT/CN2016/000303, filed on Jun. 12, 2016, which itself claims priority to Chinese Patent Application No. 201510358790.5, filed on Jun. 25, 2015 in the State Intellectual Property Office of P.R. China, which are hereby incorporated herein in their entireties by reference.

FIELD OF THE INVENTION

The present invention relates to a charging detection and control apparatus for an Apple device. More particularly, the present invention relates to a charging detection and control apparatus that detect a capacity of the charging source terminal complying with a variety of different standards and then notify the Apple device of the detection result, thereby realizing an effect in which the Apple device is charged with the maximum current.

BACKGROUND OF THE INVENTION

As mobile terminal devices are popularized, the demand for charging speed for the mobile devices becomes higher accordingly. The users' experience will be improved greatly if an effect in which the mobile devices are charged with the maximum capacity can be realized when different charging source terminals are used. But at present, there are many and various charging standards such as USB BC1.2, USB Type-C, Apple MFi and Samsung, which are not compatible with each other completely, so when the charging source terminals complying with various standards are connected to the mobile devices, the maximum charging capacity cannot be realized, and the mobile devices can only be charged with less current or cannot be charged completely. This is especially obvious for Apple mobile devices. When an Apple mobile device is inserted into a charging source terminal not complying with the Apple MFi standard, it cannot regulate the load capacity according to the Apple MFi standard and only will be charged with a little current, which lengthens the charging time. Here the Apple devices refer to Apple mobile devices such as iPhone and iPad, MFi stands for Made for iPhone, and Apple MFi standard refers to a standard intended to improve interoperability between the iPhone and iPad and accessary devices. In summary, it is in need of an intermediary between the charging source terminal and the mobile device to make the various charging standards compatible with each other.

SUMMARY OF THE INVENTION

A technical problem solved by the present invention is detecting charging capacities of the charging source terminals and notifying the mobile device terminals of the results to realize an effect in which the mobile device terminals are charged with the maximum capacity.

To solve the above technical problem, the technical solution of the present invention is: as a charging detection and control apparatus for an Apple device of the present invention, it comprises a charging input interface, a diction apparatus, a control apparatus and a charging output interface, the detection apparatus is connected to the charging source terminal via the charging input interface, the control apparatus is connected to the Apple device via the charging output interface, the detection apparatus and the control apparatus are connected together, the detection apparatus identifies a current supplying capacity of the charging source terminal complying with a variety of different standards via the charging input interface, the control apparatus converts a detection result into a charging current parameter can be supported by the Apple device and sends the charging current parameter to the Apple device via the charging input interface; the charging input interface is an USB Standard A or B interface, an USB Micro A or B interface or an USB Type-C interface, the charging output interface is an Apple Lightning interface or an USB Type-C interface, the detection apparatus comprises an USB BC1.2 charging detection apparatus, an USB Type-C charging detection apparatus, an Apple charging detection apparatus and a Samsung charging detection apparatus, the control apparatus is compliant with an Apple MFI standard USB communication apparatus. The detection apparatus detects the charging capacity supported by the charging source terminal via the charging input interface depending on the internal charging detection apparatus of different standards, and sends the detected information to the control apparatus. The control apparatus converts the received information into a charging capacity parameter complying with Apple MFI standard and sends the charging capacity parameter to the Apple device via the charging output interface, the Apple device will automatically regulate the load capacity according to the received charging capacity parameter, thereby realizing an effect in which the Apple device is charged with the maximum capacity by charging source terminals complying with different standards.

Advantageous Effects of the Invention

The detection and control apparatus for an Apple device of the present invention controls the charging parameter by detecting the current supplying capacity of the charging source terminals complying with different standards, thereby realizes an effect in which the Apple device is charged with the maximum current by a variety of different charging source terminals, expands the charging compatibility of the Apple device and shortens the charging time of the Apple device.

BRIEF DESCRIPTION OF THE DRAWINGS

Additional objectives, functions and advantages of the present invention will be set forth in the description of embodiments which follow, with reference to the accompanying drawings in which.

Wherein,
1 charging source terminal
11 first signal group
2 charging detection and control apparatus for an Apple device
3 Apple device
21 charging input interface
22 detection apparatus
23 control apparatus
24 charging output interface
25 signal option switch
26 switch control apparatus
211 second signal group
221 USB BC1.2 charging detection apparatus
222 USB Type-C charging detection apparatus
223 Samsung charging detection apparatus
224 Apple charging detection apparatus
251 first port
252 second port
253 third port
254 forth port
255 first switch

DETAILED DESCRIPTION OF THE INVENTION

Hereinafter, the charging detection and control apparatus for an Apple device of the present invention will be described in detail with reference to the embodiments in the attached drawings.

Figure 1:
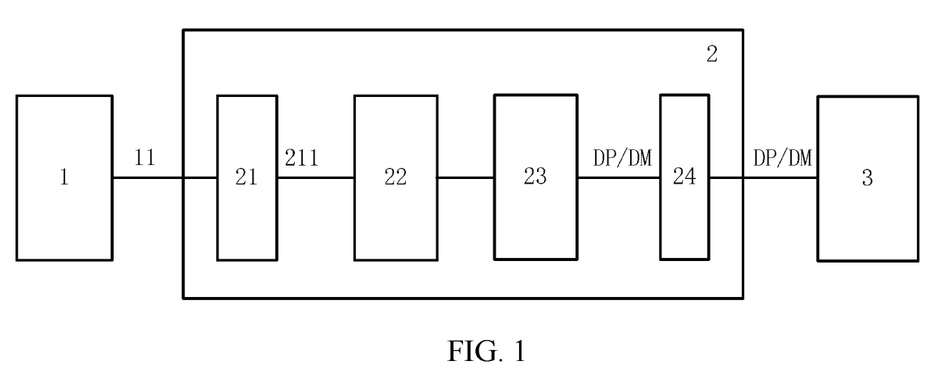
FIG. 1 illustrates a system module diagram illustrating an embodiment of the charging detection and control apparatus for an Apple device of the present invention.

FIG. 1 shows an embodiment of the present invention, a charging detection and control apparatus for an Apple device 2 comprises a charging input interface 21, a detection apparatus 22, a control apparatus 23 and a charging output interface 24. An input terminal of the detection apparatus 22 is connected to the charging input interface 21 via a second signal group 211, the charging input interface 21 is connected to a charging source terminal 1 via a first signal group 11, an output terminal of the detection apparatus 22 is connected to an input terminal of the control apparatus 23, and an output terminal DP/DM signal of the control apparatus 23 is connected to an Apple device 3 via the charging output interface 24. The detection apparatus 22 comprises an USB BC1.2 charging detection apparatus 221, an USB Type-C charging detection apparatus 222, a Samsung charging detection apparatus 223 and an Apple charging detection apparatus 224. The detection apparatus 22 detects a charging current capacity of the charging source terminal 1 inserted into the charging input interface 21 using its internal detection apparatus for different standards, and outputs a detection result to the control apparatus 23, the control apparatus 23 converts the received detection result into a charging parameter complying with Apple MFi standard, and sends the charging parameter to the Apple device 3 via the charging output interface 24. The Apple device automatically regulates the charging load capacity according to the received charging parameter, thereby realizing an effect in which the Apple device is charged with the maximum capacity.

The charging input interface 21 is an USB Standard A or B interface, an USB Micro A or B interface or an USB Type-C interface. When the charging input interface 21 is USB Standard A or B interface or USB Micro A or B interface, the first signal group 11 and the second signal group 211 include DP/DM signals. When the charging input interface 21 is USB Type-C interface, the first signal group 11 and the second signal group 211 include DP/DM and CC1/CC2 signals.

Figure 9:
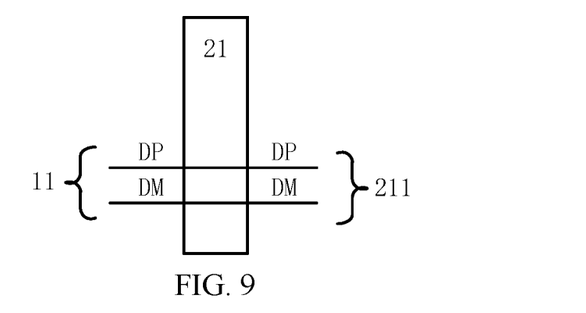
FIG. 9 illustrates an inside module diagram illustrating a charging input interface being USB Standard A or B interface or USB Micro A or B interface for the charging detection and control apparatus for an Apple device of the present invention.

FIG. 9 shows an inside module diagram illustrating the charging input interface 21 being USB Standard A or B interface or USB Micro A or B interface. DP/DM signals of the first signal group 11 are connected to DP/DM signals of the second signal group 211 through the charging input interface 21.

Figure 10:
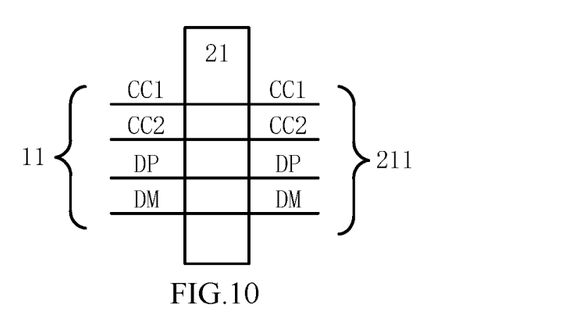
FIG. 10 illustrates an inside module diagram illustrating a charging input interface being USB Type-C interface for the charging detection and control apparatus for an Apple device of the present invention.

FIG. 10 shows an inside module diagram illustrating the charging input interface 21 being USB Type-C interface. DP/DM and CC1/CC2 signals of the first signal group 11 are connected to DP/DM and CC1/CC2 signals of the second signal group 211 through the charging input interface 21.

Figure 11:
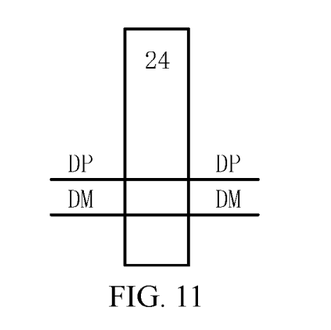
FIG. 11 illustrates an inside module diagram illustrating a charging output interface for the charging detection and control apparatus for an Apple device of the present invention.

The charging output interface 24 is an Apple Lightning interface or an USB Type-C interface. FIG. 11 shows an inside module diagram of the charging output interface 24, the charging output interface 24 including DP and DM signals.

Figure 2:
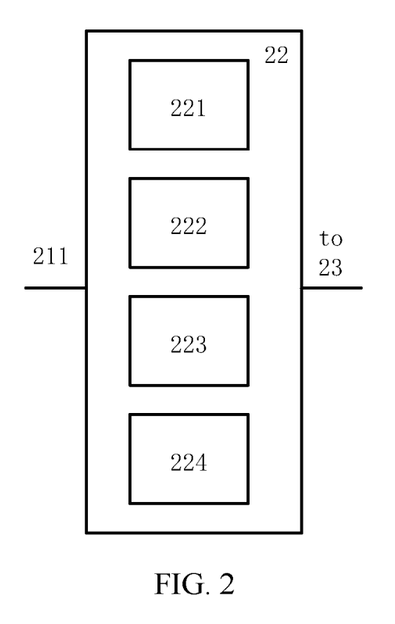
FIG. 2 illustrates a module diagram illustrating a detection apparatus of the charging detection and control apparatus for an Apple device of the present invention.

As shown in FIG. 2, the detection apparatus 22 comprises an USB BC1.2 charging detection apparatus 221, an USB Type-C charging diction apparatus 222, a Samsung charging detection apparatus 223 and an Apple charging detection apparatus 224, which detects the charging source terminals complying with different charging standards such as USB BC1.2, USB Type-C, Samsung and Apple MFi.

The charging source terminal 1 can have different circuits built in according to different charging standards to indicate the maximum charging current capability that the charging source terminal 1 can provide.

Figure 5:
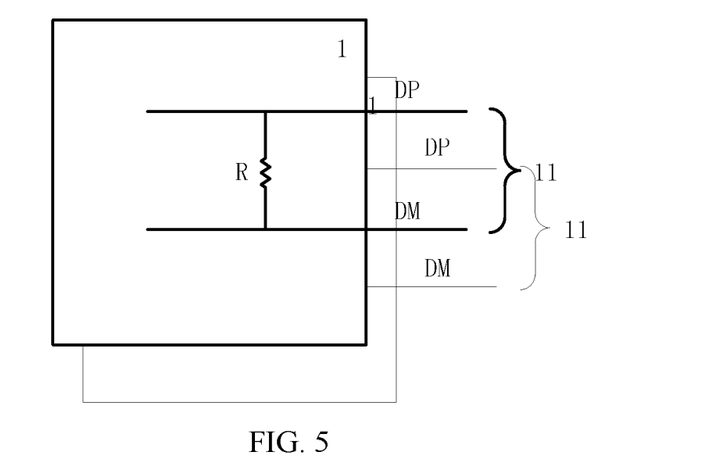
FIG. 5 illustrates an inside module diagram illustrating a charging detection apparatus compliant with USB BC1.2 for the charging detection and control apparatus for an Apple device of the present invention.

FIG. 5 shows an inside module diagram of a charging source terminal 1 compliant with USB BC1.2. The charging source terminal 1 is connected to the charging input interface 21 through the first signal group 11, the first signal group 11 including DP/DM signals. According to the USB BC1.2 standard, when a resistor R is connected between the DP and DM signals and the resistance R is less than 200 ohm, the charging source terminal 1 can provide a maximum charging current of 1 A, otherwise the charging source terminal 1 can only provide a maximum charging current of 500 mA. The USB BC1.2 standard provides a method to detect whether a resistance R less than 200 ohm is connected between the DP and DM signals. The USB BC1.2 charging detection apparatus 221 included in the detection apparatus 22 can detect whether the charging source terminal 1 can provide a maximum charging current of 1 A according to the USB BC1.2 standard.

Figure 6:
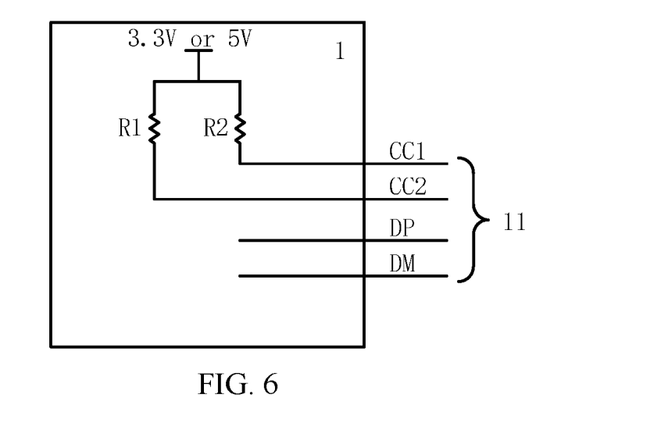
FIG. 6 illustrates an inside module diagram illustrating a charging detection apparatus compliant with USB Type-C for the charging detection and control apparatus for an Apple device of the present invention.

FIG. 6 shows an inside module diagram of a charging source terminal 1 compliant with USB Type-C. The charging source terminal 1 is connected to the charging input interface 21 through the first signal group 11, the first signal group 11 including DP/DM and CC1/CC2 signals. According to the USB Type-C standard, the charging source terminal 1 connects CC1 and CC2 signals to 3.3V or 5V voltage through resistors R1 and R2, and indicates the maximum charging current capability that charging source terminal 1 can provide by selecting different resistance values for resistors R1 and R2. The USB Type-C standard defines different resistance values for resistors R1 and R2 to indicate a maximum charging current capability of 500 mA, 1.5 A or 3 A. The USB Type-C charging detection apparatus 222 included in the detection apparatus 22 can detect whether the charging source terminal 1 can provide a maximum charging current of 500 mA, 1.5 A or 3 A according to the USB Type-C standard.

Figure 7:
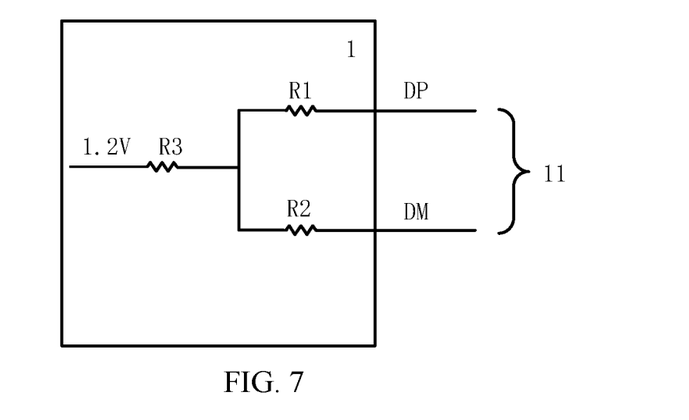
FIG. 7 illustrates an inside module diagram illustrating a charging detection apparatus compliant with Samsung standard for the charging detection and control apparatus for an Apple device of the present invention.

FIG. 7 shows an inside module diagram of a charging source terminal 1 compliant with Samsung standard. The charging source terminal 1 is connected to the charging input interface 21 through the first signal group 11, the first signal group 11 including DP/DM signals. The 1.2V voltage inside the charging source terminal 1 is connected to resistors R1 and R2 through resistor R3, and the other ends of resistors R1 and R2 are respectively connected to the DP and DM signals. The resistance of resistors R1 and R2 is much smaller than the resistance of resistor R3. In the circuit implementation, the resistance of resistors R1 and R2 can be 100 ohm, and the resistance of resistor R3 can be 100 Kohm. The Samsung charging detection apparatus 223 included in the detection apparatus 22 can detect whether the charging source terminal 1 includes the circuit shown in FIG. 7. If the charging source terminal 1 includes the circuit shown in FIG. 7, the charging source terminal 1 can provide a maximum charging current of 2 A according to the Samsung standard.

Figure 8:
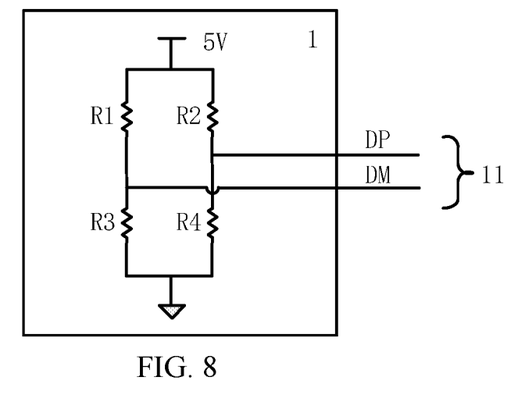
FIG. 8 illustrates an inside module diagram illustrating a charging detection apparatus compliant with Apple MFi standard for the charging detection and control apparatus for an Apple device of the present invention.

FIG. 8 shows an inside module diagram of a charging source terminal 1 compliant with Apple MFi standard. The charging source terminal 1 is connected to the charging input interface 21 through the first signal group 11, the first signal group 11 including DP/DM signals. According to the Apple MFi standard, the charging source terminal 1 is divided from 5V and connected to DP and DM through a voltage divider composed of resistors R1, R2, R3, and R4, and through selecting different resistance values for resistors Rl, R2, R3, and R4, obtains different voltage values on DP and DM to indicate the maximum charging current capability that the charging source terminal 1 can provide. The Apple MFi standard defines different resistance values for resistors R1, R2, R3, and R4 to indicate a maximum charging current capability of 500 mA, 1 A, 2.1 A or 2.4 A. The Apple MFi charging detection apparatus 224 included in the detection apparatus 22 can detect whether the charging source terminal 1 can provide a maximum charging current of 500 mA, 1 A, 2.1 A or 2.4 A according to the Apple MFi standard.

When the control apparatus 23 converts the received detection result into a charging parameter complying with Apple MFi standard, two methods are used to send the charging parameter to the Apple device 3 via the charging output interface 24. The first method is sending the charging parameter to the Apple device 3 by the way of sending a control sequence using USB communication (USB transfer) that complies with Apple MFI standard; the other method is making the Apple device 3 identify different charging parameters by regulating a signal output voltage of the charging output interface.

Figure 12:
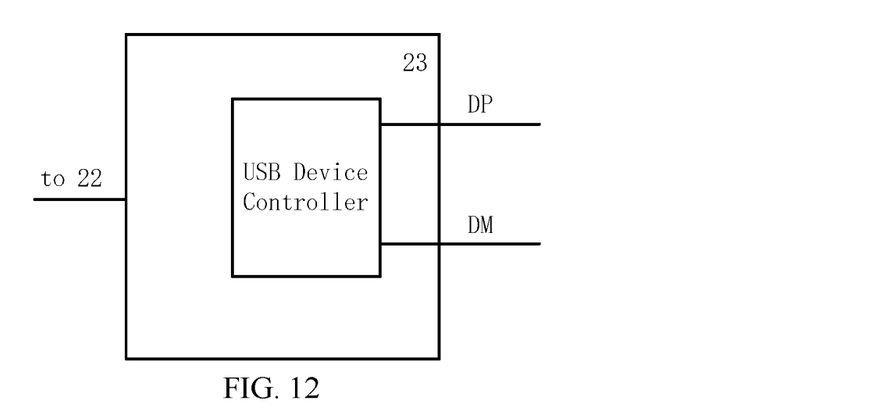
FIG. 12 illustrates an inside module diagram illustrating a first embodiment of a control apparatus for the charging detection and control apparatus for an Apple device of the present invention.

FIG. 12 shows an inside module diagram of a first embodiment of a control apparatus 23. In this embodiment, the control apparatus 23 includes a USB device controller, which is connected to a DP/DM signal and is used for the control apparatus 23 to send the charging parameter to the Apple device 3 via a USB communication (USB transfer). The Apple MFi standard defines that the charging parameter is included in USB packets. During USB communication, the Apple device 3 is a USB host, the charging detection and control apparatus for an Apple device 2 is a USB device, and the charging parameter includes the maximum charging current capability supported by the charging source terminal 1 detected by the detection apparatus 22.

Figure 13:
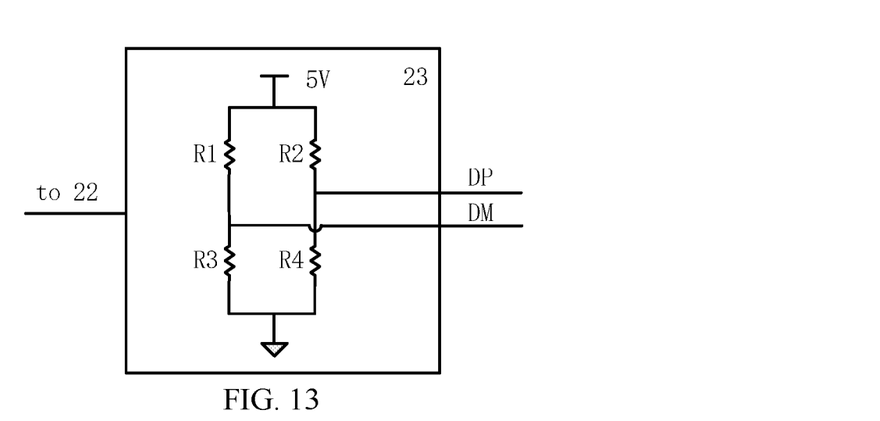
FIG. 13 illustrates an inside module diagram illustrating a second embodiment of a control apparatus for the charging detection and control apparatus for an Apple device of the present invention.

FIG. 13 shows an inside module diagram of a second embodiment of a control apparatus 23. In this embodiment, the control apparatus 23 includes a voltage divider composed of resistors R1, R2, R3, and R4 as defined by the Apple MFi standard, dividing from 5V and connecting to DP and DM. The control apparatus 23 detects according to the maximum charging current capability supported by the charging source terminal 1 as detected by the detection apparatus 22 according to Apple MFi standard and configures different resistance values of resistors R1, R2, R3, and R4, obtaining different voltage values on DP and DM to indicate the maximum charging current capability that the charging detection and control apparatus for an Apple device 2 can provide.

Figure 3:
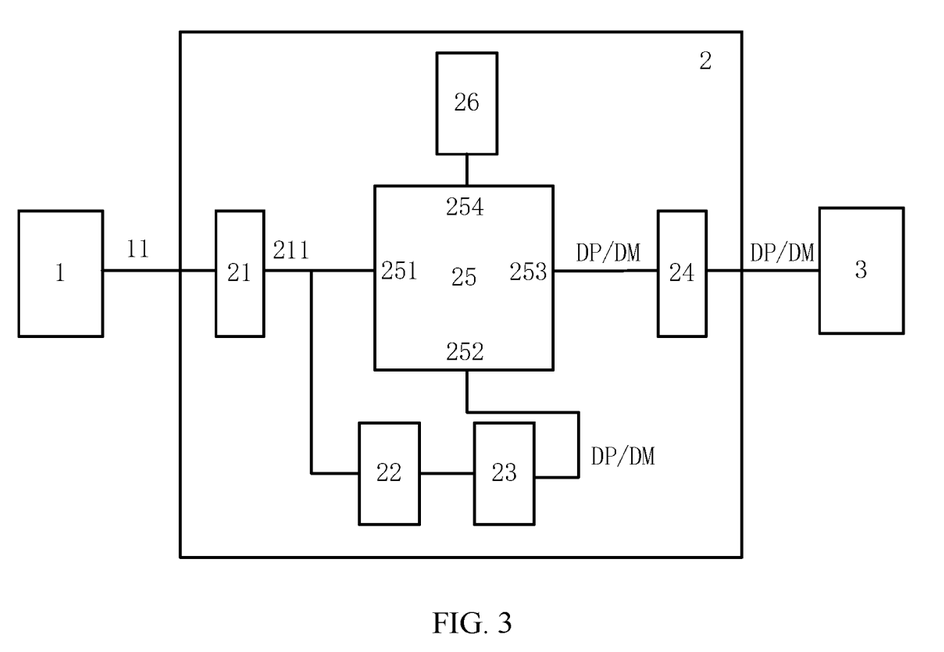
FIG. 3 illustrates a system module diagram illustrating another embodiment of the charging detection and control apparatus for an Apple device of the present invention.
Figure 4:
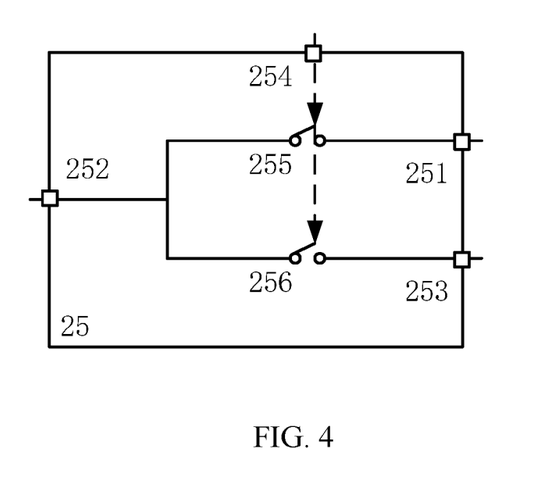
FIG. 4 illustrates an inside module diagram illustrating a signal option switch of the charging detection and control apparatus for an Apple device of the present invention.

FIG. 3 shows another embodiment of the present invention, a charging detection and control apparatus for an Apple device 2 comprises a charging input interface 21, a detection apparatus 22, a control apparatus 23, a charging output interface 24, a signal option switch 25 and a switch control apparatus 26. A first port 251, a second port 252, a third port 253 and a forth port 254 are the ports of the signal option switch, a first switch 255 and a second switch 256 are the internal switches of the signal option switch. The first switch 255 is connected between the second port 252 and the first port 251, a control terminal of the first switch 255 is connected to the forth port 254; the second switch 256 is connected between the second port 252 and the third port 253, a control terminal of the second switch 256 is connected to the forth port 254. When the charging detection and control apparatus for an Apple device is used, a charging source terminal 1 is connected to the charging input interface 21 via the first signal group 11, and the charging input interface 21 is separately connected to an input terminal of the detection apparatus 22 and the first port 251 of the signal option switch 25 via the second signal group 211, an output terminal of the detection apparatus 22 is connected to an input terminal of the control apparatus 23, the output terminal of the control apparatus 23 is connected to the second port 252 of the signal option switch 25, the third port 253 of the signal option switch 25 is connected to the Apple device 3 via the charging output interface 24, and an output terminal of the switch control apparatus 26 is connected to the forth port 254 of the signal option switch 25. This embodiment supports two operating modes, a charging detection mode and a data transmission mode. In the charging detection mode, the switch control apparatus 26 switches off the first switch 255 and switches on the second switch 256 within the signal option switch 25 by controlling the forth port 254 of the signal option switch 25, then the second port 252 and the third port 253 of the signal option switch 25 are shorten-circuit, the detection apparatus 22 detects the charging current capacity of the charging source terminal 1 inserted into the charging input interface 21 using its internal detection apparatus for different standards, and outputs a detection result to the control apparatus 23, the control apparatus 23 converts the received result into a charging parameter complying with Apple MFi standard and sends the charging parameter to the Apple device 3 through DP/DM signal via the signal option switch 25 and the charging output interface 24, the Apple device 3 automatically regulates the charging load capacity according to the received charging parameter, thereby realizing an effect in which the Apple device 3 is charged with the maximum capacity. In the charging detection mode, the functions of the charging source terminal 1, the detection apparatus 22, the control apparatus 23, and the Apple device 3 in the embodiment shown in FIG. 3 are the same as the functions of the charging source terminal 1, the detection apparatus 22, the control apparatus 23, and the Apple device 3 in the embodiment shown in FIG. 1, and the embodiment shown in FIG. 3 is equivalent to the embodiment shown in FIG. 1.

In the data transmission mode, the switch control apparatus 26 separately controls switch-on of the first switch 255 and switch-off of the second switch 256 within the signal option switch 25 by controlling the forth port 254 of the signal option switch 25 according to a demand of data communication, thereby the second port 252 and the first port 251 of the signal option switch 25 are shorten-circuit. Data communication can be carried out between the control apparatus 23 and the charging source terminal 1 USB HOST via the signal option switch 25 and the charging input interface 21. In the data transmission mode, an embodiment of the control apparatus 23 is shown in FIG. 12. The control apparatus 23 includes a USB device controller and is connected to a DP/DM signal. Data communication is carried out between the signal option switch 25 and charging input interface 21 and the charging source terminal 1, the charging source terminal 1 including USB host (not illustrated). In the data transmission mode, the charging source terminal 1 can perform USB data communication with the control apparatus 23 to access data stored in the charging detection and control apparatus for an Apple device 2 and a Micro SD card or eMMC chip (not illustrated).

The present invention expands the charging compatibility of the Apple device, and shortens the charging time of the Apple device. The Apple device refers to an Apple mobile device such as iPhone and iPad.

The foregoing embodiments are merely illustrative of preferred embodiments of the present invention and are not intended to limit the scope of the present invention. Various variations and modifications made to the technical solutions of the present invention by those skilled in the art without departing from the spirit of the present invention are embraced in the protection scope of the present invention as defined by the appended claims.

What is claimed is:

1. A charging detection and control apparatus for first vendor device, comprising a charging input interface (21), a detection apparatus (22), a control apparatus (23) and a charging output interface (24), wherein an input terminal of the detection apparatus (22) is connected to a charging source terminal (1) via the charging input interface (21), an output terminal of the detection apparatus (22) is connected to an input terminal of the control apparatus (23), an output terminal of the control apparatus (23) is connected to the first vendor device (3) via the charging output interface (24), the detection apparatus (22) detects a capacity for charging current of the charging source terminal (1) inserted into the charging input interface (21), and outputs a detection result to the control apparatus (23), the control apparatus (23) converts the received detection result into a charging parameter complying with a first vendor standard, and sends the charging parameter to the first vendor device (3) via the charging output interface (24), so that the first vendor device (3) automatically regulates a charging load capacity according to the received charging parameter, thereby resulting in the first vendor device (3) being charged with a maximum current.

2. The charging detection and control apparatus for an Apple device according to claim 1, wherein the detection apparatus (22) comprises an USB BC1.2 charging detection apparatus (221), an USB Type-C charging detection apparatus (222), a Samsung second vendor charging detection apparatus (223) and an Apple first vendor charging detection apparatus (224).

3. The charging detection and control apparatus according to claim 1, wherein the charging input interface (21) alternatively uses an USB Standard A or B interface, an USB Micro A or B interface or an USB Type-C interface.

4. The charging detection and control apparatus according to claim 1, wherein the charging output interface (24) is an 8-pin interface complying with the first vendor standard.

5. The charging detection and control apparatus for an Apple device according to claim 1, wherein the charging output interface (24) is an USB Type-C interface.

6. The charging detection and control apparatus according to claim 1, wherein the control apparatus (23) sends the charging parameter to the first vendor device (3) via the charging output interface (24) by way of sending a control sequence using USB communication that complies with the first vendor standard.

7. The charging detection and control apparatus according to claim 1, wherein the control apparatus (23) makes the first vendor device (3) identify various charging parameters by regulating a signal output voltage of the charging output interface (24).

8. The charging detection and control apparatus according to claim 1, wherein the charging detection and control apparatus (2) is implemented by an integrated circuit chip.

9. A charging detection and control apparatus, comprising a charging input interface (21), a detection apparatus (22), a control apparatus (23), a charging output interface (24), a signal option switch (25) and a switch control apparatus (26), wherein a charging source terminal (1) is connected to an input terminal of the detection apparatus (22) and a first port (251) of the signal option switch (25) respectively via the charging input interface (21), an output terminal of the detection apparatus (22) is connected to an input terminal of the control apparatus (23), an output terminal of the control apparatus (23) is connected to a second port (252) of the signal option switch (25), a third port (253) of the signal option switch (25) is connected to the first vendor device (3) via the charging output interface (24), and an output terminal of the switch control apparatus (26) is connected to a forth port (254) of the signal option switch (25), the charging detection and control apparatus supports a charging detection mode and a data transmission mode; in the charging detection mode, the switch control apparatus (26) short-circuits the second port (252) and the third port (253) of the signal option switch (25) via a control signal, the detection apparatus (22) detects a capacity for charging current of the charging source terminal (1) inserted into the charging input interface (21), and outputs a detection result to the control apparatus (23), the control apparatus (23) converts the received detection result into a charging parameter complying with a first vendor standard and sends the charging parameter to the first vendor device (3) via the signal option switch (25) and the charging output interface (24), the first vendor device (3) automatically regulates a charging load capacity according to the received charging parameter, thereby resulting in the first vendor device (3) being charged with a maximum current, in the data transmission mode, the switch control apparatus (26) alternatively short-circuits the second port (252) and the first port (251) of the signal option switch (25) or short-circuits the second port (252) and the third port (253) of the signal option switch (25) via a control signal; when the second port (252) and the first port (251) of the signal option switch (25) are short-circuited, data communication can be carried out between the control apparatus (23) and the charging source terminal (1) via the data option switch (25) and the charging input interface (21); when the second port (252) and the third port (253) of the signal option switch (25) are short-circuited, data communication can be carried out between the control apparatus (23) and the first vendor device (3) via the signal option switch (25) and the charging output interface (24), thereby resulting in the first vendor device (3) being charged with a maximum capacity and satisfying a demand of data transmission at the same time.

10. The charging detection and control apparatus for according to claim 9, wherein the detection apparatus (22) comprises an USB BC1.2 charging detection apparatus (221), an USB Type-C charging detection apparatus (222), a second vendor charging detection apparatus (223) and first vendor charging detection apparatus (224).

11. The charging detection and control apparatus according to claim 9, wherein the charging input interface (21) alternatively uses an USB Standard A or B interface, an USB Micro A or B interface or an USB Type-C interface.

12. The charging detection and control apparatus according to claim 9, wherein the charging output interface (24) is an 8-pin interface complying with the first vendor standard.

13. The charging detection and control apparatus according to claim 9, wherein the charging output interface (24) is an USB Type-C interface.

14. The charging detection and control apparatus according to claim 9, wherein the control apparatus (23) sends the charging parameter to the first vendor device (3) via the charging output interface (24) by way of sending a control sequence using USB communication that complies with Apple MFI the first vendor standard.

15. The charging detection and control apparatus according to claim 9, wherein the control apparatus (23) makes the first vendor device (3) identify various charging parameters by regulating a signal output voltage of the charging output interface (24).

16. The charging detection and control apparatus according to claim 9, wherein the charging detection and control apparatus (2) is implemented by an integrated circuit chip.

* * * * *